United States Patent [19]

Naka et al.

[11] Patent Number: 4,742,089
[45] Date of Patent: May 3, 1988

[54] RIGID POLYURETHANE FOAM AND PROCESS FOR PRODUCING THE SAME

[75] Inventors: Reishi Naka; Kazuyoshi Kuroishi, both of Tochigi, Japan

[73] Assignee: Hitachi, Ltd., Tokyo, Japan

[21] Appl. No.: 84,216

[22] Filed: Aug. 12, 1987

[51] Int. Cl.$^4$ ............................................. C08G 18/30
[52] U.S. Cl. .................................... 521/110; 521/112; 521/115; 521/129; 521/131; 521/159; 521/164; 521/167; 521/173; 521/175; 521/177
[58] Field of Search ............... 521/110, 112, 115, 129, 521/131, 159, 164, 167, 173, 175, 177

[56] References Cited

U.S. PATENT DOCUMENTS 4,500,656  2/1985  Rasshoffer et al. ................. 521/164

FOREIGN PATENT DOCUMENTS 0091828  10/1983  European Pat. Off. .

*Primary Examiner*—Maurice J. Welsh
*Assistant Examiner*—Sam A. Acquah
*Attorney, Agent, or Firm*—Antonelli, Terry & Wands

[57] ABSTRACT

Rigid polyurethane foams produced by reacting a polyol component having a special composition with an isocyanate component in the presence of a blowing agent, a reaction catalyst and a foam stabilizer with a mold release time of as short as 5.5 minutes or less, have remarkably low thermal conductivity of $12.5 \times 10^{-3}$ Kcal/m.hr.°C. or less and a low density and are suitable as heat insulating materials for refrigerators and the like.

14 Claims, No Drawings

RIGID POLYURETHANE FOAM AND PROCESS FOR PRODUCING THE SAME

BACKGROUND OF THE INVENTION

This invention relates to a process for producing a rigid polyurethane foam having a remarkably low thermal conductivity and a low density with a short mold release time, and the rigid polyurethane foam thus produced.

Rigid polyurethane foams are usually obtained by reacting an polyol component with an isocyanate component in the presence of a blowing agent, a reaction catalyst and a foam stabilizer. Since rigid polyurethane foams are generally excellent in heat insulating properties, they are widely used as various kinds of heat insulating materials but have many problems in moldability, uniformity in foaming, and the like. Various proposals have been made in order to improve these problems.

For example, Japanese Patent Unexamined Publication No. 58-134108 proposes to use aromatic amine polyols mixed with a diluting polyol having a higher proportion of primary hydroxyl group and a low viscosity, e.g. a polyol having a molecular weight of 600 or less and obtained by adding ethylene oxide to a polyhydric alcohol, in order to produce rigid polyurethane foams with good moldability. Further, Japanese Patent Unexamined Publication No. 58-134109 proposes to use aromatic polyols terminals of which are capped with ethylene oxide as one component of polyol components in order to improve heat insulating properties by enhancing the uniformity of foam sizes of low density rigid polyurethane foams. But the rigid polyurethane foams obtained by the two above-mentioned processes of Japanese Patent Unexamined Publications have a relatively large thermal conductivity of 13.6 to $13.9 \times 10^{-3}$ Kcal/m. hr. °C., which values are insufficient as an heat insulating material for refrigerators.

As heat insulating materials for refrigerators, it is desired to have a thermal conductivity of $12.5 \times 10^{-3}$ Kcal/m. hr. °C. or less, more preferably $12.0 \times 10^{-3}$ to $11.0 \times 10^{-3}$ Kcal/m. hr. °C., a low density and a mold release time of a short time, preferably 5.5 minutes or less, more preferably 5 minutes or less.

In order to meet the above-mentioned requirements, European Patent No. 91,828 discloses a process for producing a rigid polyurethane foam wherein there is used as a polyol component a polyol mixture comprising (1) a tetrafunctional tolylenediamine polyol, (2) a bifunctional propylene polyol, (3) an octafunctional sucrose polyol and (4) a trifunctional diethanolamine polyol. The rigid polyurethane foam obtained by this process has an average foam diameter of 0.3 to 0.5 mm, a foam density (a panel foam density) of as low as 28 to 30 kg/m³ and a mold release time of as short as 4 minutes, but a thermal conductivity is as slightly high as 13.0 to $15.0 \times 10^{-3}$ Kcal/m.hr. °C., which value is insufficient for refrigerators.

On the other hand, Japanese Patent Unexamined Publication No. 62-81414 discloses a process for producing a rigid polyurethane foam having an average foam diameter of as fine as 0.1 to 0.2 mm, and a thermal conductivity of 11.0 to $12.0 \times 10^{-3}$ Kcal/m.hr.°C. by using a polyol mixture containing methyl glucoside polyol. According to this process, the thermal conductivity is remarkably improved, but undesirably the skeleton strength of foam is weakened, the foam density (a panel foam density) is as large as 33 to 36 kg/m³ (10 to 20% is increased compared with the value of European Patent No. 91,828) due to very fine foam density, and the mold release time is 6 minutes or longer.

Therefore, it has long been desired to produce rigid polyurethane foams having a very low thermal conductivity and a low density in a short mold release time, suitable for use as a heat insulating material for refrigerators.

SUMMARY OF THE INVENTION

It is an object of this invention to provide a rigid polyurethane foam having a remarkably low thermal conductivity and a low density produced in a short mold release time, and a process for producing the same.

This invention provides a process for producing a rigid polyurethane foam comprising reacting a polyol component with an isocyanate component in the presence of a blowing agent, a reaction catalyst and a foam stabilizer, characterized in that the polyol component is a mixed polyol composition comprising (a) 48 to 52% by weight of a polyol obtained by adding propylene oxide and ethylene oxide to tolylenediamine, (b) 10 to 40% by weight of a polyol obtained by adding ethylene oxide to bisphenol, (c) 13 to 17% by weight of a polyol obtained by adding propylene oxide to trimethylolpropane, (d) 9 to 13% by weight of a polyol obtained by adding propylene oxide to sucrose, and (e) 10 to 14% by weight of a polyol obtained by adding propylene oxide and ethylene oxide to diethanolamine, said mixed polyol composition having an average OH value of 440 to 470.

This invention further provides a rigid polyurethane foam produced by the above-mentioned process.

This invention still further provides a composition useful for producing the rigid polyurethane foam used in the process mentioned above.

This invention also provides a use of the rigid polyurethane foam as a heat insulating material for refrigerators.

DESCRIPTION OF THE PREFERRED EMBODIMENTS

This invention is characterized by using a special mixed polyol composition as the polyol component. By using such a special mixed polyol composition, the mold release time (from the beginning of pouring a reaction mixture into a foaming mold to removing a foamed article from the foaming mold) can be shortened to 5 minutes or less, preferably 4.5 minutes or less, the density of rigid polyurethane foam obtained can be as low as 33 kg/m³ or less, which value is for usual foams, preferably 28 to 31 kg/m³ in terms of the panel foam density, the fluidity can be improved remarkably (the difference between the free foam density and the panel foam density can be made about 10 kg/m³ or less, preferably 8 kg/m³ or less), and the thermal conductivity can be lowered to $12.5 \times 10^{-3}$ Kcal/m.hr. °C. or less, preferably 12.0 to $11.0 \times 10^{-3}$ Kcal/m.hr.°C. or less.

The mixed polyol composition used in this invention comprises (a) 48 to 52% by weight of a polyol obtained by adding propylene oxide and ethylene oxide to tolylenediamine diamine, (b) 10 to 40% by weight of a polyol obtained by adding ethylene oxide to bisphenol such as bisphenol A, (c) 13 to 17% by weight of a polyol obtained by adding propylene oxide to trimethylolpropane, (d) 9 to 13% by weight of a polyol obtained by adding propylene oxide to sucrose, and (e) 10 to 14% by weight of a polyol obtained by adding propylene oxide and ethylene oxide to diethanolamine, said mixed polyol composition having an average OH value of 440 to 470.

In the mixed polyol composition, it seems that the component (a) is most effective for lowering the thermal conductivity, the component (b) is effective for making the foams fine, the component (c) is effective for making the foams finer and for improving the dimensional stability when the foam is low in the density, the component (d) is effective to improve the mold release properties, and the component (e) is effective for improving the fluidity. When the proportions of the above-mentioned components (a) to (e) are outside the above-mentioned range, the objects of this invention cannot be attained.

Further, when the average OH value of the mixed polyol composition is less than 440, the dimensional stability is lowered, while when the average OH value is larger than 470, the friability readily takes place. Therefore, the average OH value should be 440 to 470 in order to produce the rigid polyurethane foam stably, considering that too high or too low average OH value reduces productivity.

Considering the foam density, the thermal conductivity and the mold release time, the following mixed polyol composition is the most preferable:

(a) 50% by weight of a polyol obtained by adding propylene oxide and ethylene oxide to tolylenediamine, (b) 12% by weight of a polyol obtained by adding ethylene oxide to bisphenol, (c) 15% by weight of a polyol obtained by adding propylene oxide to trimethylolpropane, (d) 11% by weight of a polyol obtained by adding propylene oxide to sucrose, and (e) 12% by weight of a polyol obtained by adding propylene oxide and ethylene oxide to diethanolamine, and the average OH value of polyol composition being 450.

These polyols mentioned above can be prepared by conventional processes.

As the isocyanate component which reacts with the polyol component, there can be used aromatic, aliphatic, alicyclic isocyanates, and the like. Among them, the use of aromatic isocyanates is preferable. Examples of aromatic isocyanates are tolylene diisocyanate (TDI), diphenylmethane diisocyanate (MDI), polymethylene polyphenyl isocyanate (PAPI), naphthalene diisocyanate, xylylene diisocyanate, dianisidine diisocyanate, etc. Examples of non-aromatic isocyanates are hexamethylene diisocyanate, isophorone diisocyanate, methylene-bis(cyclohexyl isocyanate), etc. More preferable examples are a mixture of 2,4-tolylene diisocyanate and 2,6-tolylene diisocyanate, 4,4'-diphenylmethane diisocyanate, polymethylene polyphenyl isocyanate having an average functional number of 2.2 to 4.0, sucrose series tolylene diisocyanate prepolymer, and the like aromatic polyisocyanates.

It is possible to use so-called modified isocyanates obtained by modifying isocyanates with various methods and compounds.

Further, when a mixture of polymethylene polyphenyl diisocyanate and a sucrose tolylene diisocyanate prepolymer, the content of the latter being preferably 30 to 70% by weight, more preferably 45 to 50% by weight, is used as the isocyanate component, the fluidity can be improved without lowering the mold release properties, and further the skeleton strength of rigid foam is improved and the dimensional stability is remarkably improved in the case of lowering the density of the rigid foam.

It is preferable to use the isocyanate component having the NCO percent of preferably 30 to 36%, more preferably 32 to 34%, from the viewpoint of the balance of dimensional stability and fluidity.

The reaction ratio of the isocyanate component to the polyol component is preferably 1.00 to 1.20, more preferably 1.10, in terms of the ratio of NCO of isocyanate to OH of polyol, i.e. NCO/OH.

A rigid polyurethane foam can be produced by reacting the polyol component with the isocyanate component as fundamental starting materials in the presence of a blowing agent, a reaction catalyst, and a foam stabilizer.

As the blowing agent, there can be used water, a combination of water and carbon dioxide gas or a compound which generates carbon dioxide, a fluorocarbon blowing agent, air and the like inert gas. Examples of the fluorocarbon blowing agent are trichloromonofluoromethane, dichlorodifluoromethane, trichlorotrifluoroethane, dichlorotetrachloroethane, etc. When the fluorocarbon blowing agent is used as the blowing agent, it is used in an amount of 20 parts by weight or more, more preferably 30 to 60 parts by weight, based on 100 parts by weight of the polyol component.

The reaction catalyst used in preparing the foams of this invention may be any of the catalysts known to be useful for this purpose, including tertiary amines, organometallic salts, and mixtures of an organometallic salt with one or more tertiary amines, the latter being preferred. Examples of the tertiary amines are triethylamine, triethylene diamine, trimethylamine, tetramethylene diamine, tetramethylbutane diamine, tetramethylhexamethylene diamine, N-methylmorpholine, N-ethylmorpholine, dimethylpiperazine, trimethylaminoethylpiperazine, dimethylaminooxadecane, dimethylcyclohexylamine, mixtures of bis(dimethylaminoethyl ether) and dipropylene glycol such as 7:3 weight ratio mixture, methyldicyclohexylamine, N-cyclohexylmorpholine, dimethylcyclohexylamine, methyldiethanolamine, mixtures of dimethylcyclohexylamine and 2(3-pentyl)-1-dimethylaminocyclohexane, bis(dimethylaminoethylpropyl ether), mixtures of triethylene diamine and dipropylene glycol such as the 1:2 and 1:4 weight ratio mixtures, bis(dimethylaminopropyl ether), and mixtures of these catalysts. The preferred tertiary amine reaction catalysts are triethylenediamine, mixtures of triethylenediamine with dipropylene glycol, mixtures of bis(dimethylaminoethyl ether) and dipropylene glycol, dimethylcyclohexylamine alone or as a mixture thereof with 2-(3-pentyl)-1-dimethylaminocyclohexane. The tertiary amine reaction catalyst is used in an amount of preferably 0.1 to 1.5 parts by weight, more preferably 0.25 to 0.75 part by weight per 100 parts by weight of the total polyol component.

Examples of the organo-metallic salts are salts of tin, titanium, antimony, aluminum, cobalt, zinc, bismuth, lead, and cadmium, the tin salts, i.e., stannic and stannous salts, being preferred. Illustratively such salts include the octoates, dilaurates, diacetates, dioctoates, oleates, and neodecanates of these metals, the octoates being preferred. The organometallic salt reaction catalyst is used in an amount of preferably about 0 to 0.5 part by weight, more preferably about 0.05 to 0.2 part by weight, per 100 parts by weight of the total polyol component. Particular when a mixed catalyst of a 33% dipropylene glycol solution of triethylene diamine, trimethylaminoethylpiperazine, an ethylene glycol solution of bis-2-dimethylaminoethyl ether, and formic acid is used, the fluidity and the mold release properties are further improved and most preferable results can be expected.

As the foam stabilizer, there can be used conventionally used organic silicone compounds, fluorine-containing surface active agents, etc.

For example, there can be used polyalkylene glycol silicone block copolymer represented by the formula:

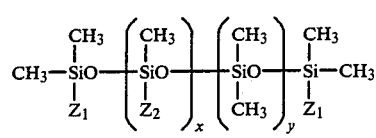

wherein $Z_1$ is $CH_3$ or $-(CH_2)_a-(OC_2H_4)_b-(OC_3H_6)_c-OCH_3$; $Z_2$ is $-(CH_2)_a-(OC_2H_4)_b-(OC_3H_6)_c-OCH_3$; a is an integer of 3; b is an integer of 15 to 25; c is an integer of 5 to 15; x is zero or an integer of 1 to 7; and y is zero or an integer of 1 to 17. Among the compounds of the formula (I), those having $-(CH_2)_3-(OC_2H_4)_{20}-(OC_3H_6)_9-OCH_3$ at both $Z_1$ and $Z_2$, x being 2 to 4 and y being 12 to 14 are particularly preferable.

The foam stabilizer is preferably used in an amount of 0.1 to 5 parts by weight per 100 parts by weight of the total polyol component.

The composition for producing rigid polyurethane foams may further contain one or more conventional fire retardants, fillers, reinforcing fibers, colorants, and the like additives.

Rigid polyurethane foams can be produced by a one-shot process, a semi-prepolymer process, a prepolymer process, a spray process, and the like. Among them, the one-shot process is preferable.

The foaming can be carried out by using a conventional foaming machine, for example, Pu-30 type foaming machine manufactured by Promat AG. Foaming conditions slightly change depending on the kind of foaming machines used but usually are as follows:
 liquid temperature: 18°-24° C.
 charging pressure: 80-120 kg/cm²
 charging amount: 15-30 kg/min
 mold temperature: 35°-45° C.
More preferable foaming conditions are as follows:
 liquid temperature: 20° C.
 charging pressure: 100 kg/cm²
 charging amount: 25 kg/min
 mold temperature: 40° C.

The thus produced rigid polyurethane foams have a remarkably low thermal conductivity of $12.5 \times 10^{-3}$ Kcal/m.hr.°C. or less, particularly $12.0-11.0 \times 10^{-3}$ Kcal/m.hr.°C. while keeping the density of the foams at usual low level, and the mold release time can be shortened to 5.5 minutes or less, particularly 5 minutes or less, so that these rigid polyurethane foams are remarkably excellent as a heat insulating material for refrigerators. Further, the rigid polyurethane foams can also be used as heat insulating materials for other electric machines and devices, building structures, vehicles, etc., or as heat insulating molded articles.

This invention is illustrated in detail by way of the following Examples, in which all "parts" and "percents" are by weight unless otherwise specified.

EXAMPLES 1 to 5, COMPARATIVE EXAMPLES 1 to 3

Using 100 parts of polyol components having an average OH value of 440 to 470 as shown in Table 1 (PO=propylene oxide, EO=ethylene oxide), 0.5 part of water (but 1.5 parts in Comparative Example 1), 2 parts of polyalkylene glycol silicone block copolymer of the formula (I) ($Z_1=CH_3$, x=3, y=13) (L-5340, a trade name, mfd. by Nippon Unikar Co.) as a foam stabilizer, isocyanate components as listed in Table 1 (NCO/OH=1.10) wherein polymethylene polyphenyl diisocyanate (NCO%=31) and sucrose tolylene diisocyanate prepolymer(NCO%=35) were used in amounts as listed in Table 1, 4 parts of a catalyst mixture comprising a 33% dipropylene glycol solution of triethylene diamine, trimethylaminoethylpiperazine, and dimethylaminooxadecane, and 43 to 46 parts of trichloromonofluoromethane (R-11, a trade name, mfd. by E. I. du Pont de Nemours & Co.) as a blowing agent, foaming and curing were conducted to test physical properties as listed in Table 1.

In Table 1, the physical properties were obtained as follows:
Free foam density (a):
 A density of a foam obtained by foaming in a container of 200×200×200 mm in inside dimensions made of a veneer board (kg/m³).
Panel foam density (b):
 A density of a foam obtained by foaming at 40° C. in a container of 400×600×35 (thickness) mm in inside dimensions made of aluminum (kg/m³).
Fluidity: (b)−(a)
Dimensional stability:
 Change (%) in thickness direction of a panel foam of 450×650×35 (thickness) mm after standing at −20° C. for 24 hours.
Thermal conductivity:
 Measured by using Anacon 88 type (mfd. by Anacon Co.) and a panel foam of 200×200×50 (thickness) mm at an average temperature of 23.8° C.
Mold release time:
 A time from the beginning of pouring of a liquid composition to a mold of 400×1100×65 (thickness) mm in inner dimensions made of aluminum to the removing of the resulting foam from the mold. Foaming was conducted at 40° C. As a measure for releasable foaming, the growth at the thickness direction of a foam was made 2 mm or less.

TABLE 1

| | Example No. | Comparative Example | | | Example | | | | |
|---|---|---|---|---|---|---|---|---|---|
| | | 1 | 2 | 3 | 1 | 2 | 3 | 4 | 5 |
| Polyol | Tolylenediamine + PO/EO (%) | 65 | 50 | 50 | 50 | 50 | 50 | 50 | 50 |
| | Bisphenol A + EO (%) | — | 12 | 12 | 12 | 12 | 12 | 12 | 12 |
| | Methyl glycoside + PO (%) | — | 15 | 15 | — | — | — | — | — |

TABLE 1-continued

|  |  | Comparative Example | | | Example | | | | |
|---|---|---|---|---|---|---|---|---|---|
|  | Example No. | 1 | 2 | 3 | 1 | 2 | 3 | 4 | 5 |
|  | Trimethylolpropane + PO (%) | — | — | — | 15 | 15 | 15 | 15 | 15 |
|  | Diethanolamine + PO/EO (%) | 6 | 12 | 12 | 12 | 12 | 12 | 12 | 12 |
|  | Sucrose + PO (%) | 14 | 11 | 11 | 11 | 11 | 11 | 11 | 11 |
|  | Propylene glycol + PO (%) | 15 | — | — | — | — | — | — | — |
| Isocyanate | Polymethylene polyphenyl diisocyanate (%) | 100 | 70 | 70 | 70 | 60 | 55 | 50 | 45 |
|  | Sucrose tolylene diisocyanate prepolymer (%) | — | 30 | 30 | 30 | 40 | 45 | 50 | 55 |
| Blowing agent | Trichloromonofluoromethane (parts) | 46 | 43 | 46 | 46 | 46 | 46 | 46 | 46 |
| Physical | Free foam density (a) (kg/m$^3$) | 21.5 | 24.3 | 23.2 | 23.0 | 22.8 | 22.6 | 22.5 | 22.5 |
| properties | Panel foam density (b) (kg/m$^3$) | 29.2 | 34.3 | 32.8 | 32.6 | 32.2 | 32.0 | 31.9 | 31.8 |
|  | Fluidity (b) − (a) | 7.7 | 10.0 | 9.6 | 9.6 | 9.4 | 9.4 | 9.4 | 9.3 |
|  | Dimensional stability (%) | −0.5 | −0.6 | −3.0 | −2.3 | −2.0 | −1.5 | −1.5 | −1.2 |
|  | Thermal conductivity ($10^{-3}$ Kcal/m.hr. °C.) | 13.5 | 11.5 | 12.0 | 11.7 | 11.8 | 11.8 | 11.9 | 11.9 |
|  | Mold release time (min) | 4.5 | 6 | 5.5 | 5 | 5 | 5 | 5 | 5 |

As is clear from Table 1, in Comparative Example 1 wherein a polyol obtained by adding ethylene oxide to bisphenol A and a polyol obtained by adding propylene oxide to trimethylolpropane are not contained, the mold release time is as good as 4.5 minutes but the thermal conductivity is as high as $13.5 \times 10^{-3}$ Kcal/m.hr.°C., which value is inferior to the present invention. In Comparative Examples 2 and 3 wherein there is used a polyol obtained by adding propylene oxide to methylene glycoside in place of a polyol obtained by adding propylene oxide to trimethylolpropane, the thermal conductivity is improved to $11.5-12.0 \times 10^{-3}$ Kcal/m.hr.°C., but the mold release time is undesirably as long as 6 to 5.5 minutes.

In contrast, in Examples 1 to 5, the thermal conductivity is as low as $12 \times 10^{-3}$ Kcal/m.hr.°C. and the mold release time is as good as 5 minutes. Further, the panel foam density is about 32 kg/m$^3$, which value satisfies the requirement of low density. Further, in the cases of Examples 3 and 4, wherein the content of sucrose tolylene diisocyanate prepolymer is 45 to 50% in the total isocyanate components, the panel foam density is lowered preferably to 31.9 to 32.0 kg/m$^3$.

As a result, as shown in Example 3, the following combination of starting materials is the most preferable from the viewpoint of balance of fluidity, dimensional stability, thermal conductivity and mold release properties:

| Polyol | tolylene diamine + PO + EO | 50% |
|---|---|---|
|  | bisphenol A + EO | 12% |
|  | trimethylolpropane + PO | 15% |
|  | sucrose + PO | 11% |
|  | diethanolamine + PO + EO | 12% |
| Isocyanate | polymethylene polyphenyl diisocyanate | 55% |
|  | sucrose tolylene diisocyanate prepolymer | 45% |

EXAMPLES 6 to 13

There were used as the polyol, the same mixed polyol composition as used in Example 3 in an amount of 100 parts, water in an amount of 0.5 part, polyalkylene glycol silicone block copolymer as shown in Table 2 in an amount of 2 parts as a foam stabilizer, as the catalyst, the same catalyst (A) as used in Examples 1 to 5 in an amount of 4 parts, or a mixed catalyst (B) comprising a 33% dipropylene glycol solution of triethylene diamine, trimethylaminoethylpiperazine, an ethylene glycol solution of bis-2-dimethylaminoethyl ether, and formic acid in an amount of 3.5 parts, as the blowing agent, trichloromonofluoromethane (R-11) in an amount of 44–46 parts, the same mixed isocyanate as used in Example 3 (NCO/OH=1.10), and the foam stabilizer as shown in Table 2, and foaming and curing were carried out in the same manner as described in Examples 1 to 5.

The results are as shown in Table 2.

TABLE 2

|  |  |  | Example No. | | | | | | | |
|---|---|---|---|---|---|---|---|---|---|---|
|  |  |  | 6 | 7 | 8 | 9 | 10 | 11 | 12 | 13 |
| Foam stabilizer *1 | $CH_3-SiO-\left(\begin{array}{c}CH_3\\|\\SiO\\|\\Z_2\end{array}\right)_x \left(\begin{array}{c}CH_3\\|\\SiO\\|\\CH_3\end{array}\right)_y \begin{array}{c}CH_3\\|\\Si-CH_3\\|\\Z_1\end{array}$ with $CH_3-SiO-$ and $Z_1$ | x | 0 | 2 | 4 | 6 | 2 | 2 | 2 | 2 |
|  |  | y | 12 | 12 | 12 | 12 | 10 | 12 | 14 | 16 |
| Catalyst *2 | Mixed catalyst (A) or (B) |  | (A) | (A) | (A) | (A) | (B) | (B) | (B) | (B) |
| Blowing agent | Trichloromonofluoromethane (parts) |  | 46 | 46 | 46 | 46 | 44 | 44 | 44 | 44 |
| Physical | Free foam density (a) (kg/m$^3$) |  | 22.4 | 22.3 | 22.3 | 22.2 | 22.2 | 22.0 | 21.9 | 21.9 |
| properties | Panel foam density (b) (kg/m$^3$) |  | 31.0 | 30.5 | 30.5 | 30.4 | 30.0 | 29.4 | 29.3 | 29.3 |
|  | Fluidity (b) − (a) |  | 8.6 | 8.3 | 8.2 | 8.2 | 7.8 | 7.4 | 7.4 | 7.4 |
|  | Dimensional stability (%) |  | −0.5 | −0.7 | −0.7 | −2.0 | −0.5 | −0.6 | −0.6 | −1.7 |
|  | Thermal conductivity ($10^{-3}$ Kcal/m · hr · °C.) |  | 12.3 | 11.6 | 11.5 | 11.5 | 12.1 | 11.6 | 11.6 | 11.5 |
|  | Mold release time (min) |  | 4.5 | 4.5 | 4.5 | 4.5 | 4 | 4 | 4 | 4.5 |

Note
*1: $Z_1$ and $Z_2$ are each $-(CH_2)_3-(OC_2H_4)_{20}-(OC_3H_6)_9-OCH_3$
*2: Mixed catalyst (A):

| 33% Dipropylene glycol solution of triethylenediamine | 50% |
|---|---|
| Trimethylaminoethylpiperazine | 15% |
| Dimethylaminooxadecane | 35% |

Mixed catalyst (B):

| 33% Dipropylene glycol solution of triethylenediamine | 20% |
|---|---|

TABLE 2-continued

|  | Example No. | | | | | | | |
| --- | --- | --- | --- | --- | --- | --- | --- | --- |
|  | 6 | 7 | 8 | 9 | 10 | 11 | 12 | 13 |
| Trimethylaminopiperazine | 20% | | | | | | | |
| Ethylene glycol solution of bis-2-dimethylaminoethyl ether | 50% | | | | | | | |
| Formic acid | 10% | | | | | | | |

As is clear from Table 2, when the polyalkylene glycol silicone block copolymer of the formula:

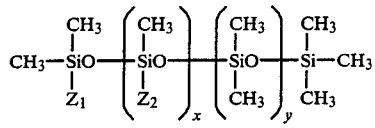

wherein $Z_1$ and $Z_2$ are each $-(CH_2)_3-(OC_2H_4)_{20}-(OC_3H_6)_9OCH_3$; x is an integer of 2 to 4; and y is an integer of 12 to 14 is used as in Examples 7, 8, 11 and 12, the thermal conductivity becomes $11.6 \times 10^{-3}$ Kcal/m.hr.°C. or less, the mold release time becomes 4.5 minutes or less and the panel foam density is further lowered to 30.5 kg/m³ or less, so that more excellent effects are obtained compared with those of Examples 1 to 5.

Further, when the mixed catalyst (B) is used, it is revealed that the fluidity is further improved, (the difference between the panel foam density (b) and the free foam density (a) being 7.4 kg/m³), the panel foam density becomes 30 kg/m³ or less, and the mold release time becomes 4.5 minutes or less, these effects being more preferable.

As shown in the above Examples, it is possible to produce rigid polyurethane foams having remarkably low thermal conductivity and low density with a very short mold release time, said rigid polyurethane foams satisfying the same foam properties as those of conventional rigid polyurethane foams by properly combining the special mixed polyol composition, the special isocyanate proportions and the special foam stabilizer. Particularly, as shown in Examples 7, 8, 11 and 12, the difference between the free foam density and the panel foam density is lessened to show by far better fluidity than conventional foams, so that more effects can be exhibited at the time of pouring the starting material liquid into a mold practically.

As mentioned above, according to this invention, the density of the resulting foams can be lowered by 10% or more compared with conventional low thermal conductivity foams, while maintaining the thermal conductivity of the foams as remarkably low as 0.0125 Kcal/m.hr.°C. or less, more preferably 0.0110 to 0.0120 Kcal/m.hr.°C. In other words, there can be obtained rigid polyurethane foams having almost the same density of 30 kg/m³ (in terms of the panel foam density) as conventional foams (the thermal conductivity being as poor as 0.0135 to 0.0150 Kcal/m.hr.°C.), so that it is possible to attain energy saving and space saving by lessening the thickness of heat insulating materials, which results in lowering the production cost while maintaining the excellent effects as mentioned above. Further, since the density of foam is maintained at a low level, the foaming pressure is lessened and the mold release time can be shortened remarkably.

What is claimed is:

1. A process for producing a rigid polyurethane foam which comprises reacting a polyol component with an isocyanate component in the presence of a blowing agent, a reaction catalyst and a foam stabilizer, said polyol component being a mixed polyol composition comprising
    (a) 48 to 52% by weight of a polyol obtained by adding propylene oxide and ethylene oxide to tolylenediamine, (b) 10 to 40% by weight of a polyol obtained by adding ethylene oxide to bisphenol,
    (c) 13 to 17% by weight of a polyol obtained by adding propylene oxide to trimethylolpropane,
    (d) 9 to 13% by weight of a polyol obtained by adding propylene oxide to sucrose, and
    (e) 10 to 14% by weight of a polyol obtained by adding propylene oxide and ethylene oxide to diethanolamine, said mixed polyol composition having an average OH value of 440 to 470.

2. A process according to claim 1, wherein the polyol component and the isocyanate component are used in a reaction ratio of NCO/OH=1.00 to 1.20.

3. A process according to claim 1, wherein the isocyanate component is a mixture of 50 to 55% by weight of polymethylene polyphenyl diisocyanate and 45 to 50% by weight of sucrose tolylene diisocyanate prepolymer, said mixture having NCO percent of 32 to 34.

4. A process according to claim 1, wherein the foam stabilizer is a polyalkylene glycol silicone block copolymer represented by the formula:

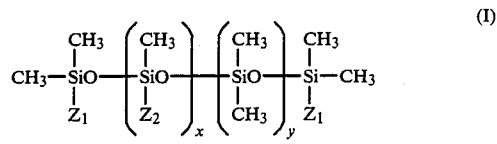

(I)

wherein $Z_1$ and $Z_2$ are independently $-(CH_2)_a-(OC_2H_4)_b-(OC_3H_6)_c-OCH_3$; a is an integer of 3; b is an integer of 15 to 25; c is an integer of 5 to 15; x is an integer of 2 to 4; and y is an integer of 12 to 14.

5. A rigid polyurethane foam produced by the process of claim 1.

6. A rigid polyurethane foam produced by the process of claim 2.

7. A rigid polyurethane foam produced by the process of claim 3.

8. A rigid polyurethane foam produced by the process of claim 4.

9. A mixed polyol composition for producing a rigid polyurethane foam comprising
    (a) 48 to 52% by weight of a polyol obtained by adding propylene oxide and ethylene oxide to tolylenediamine,
    (b) 10 to 40% by weight of a polyol obtained by adding ethylene oxide to bisphenol,
    (c) 13 to 17% by weight of a polyol obtained by adding propylene oxide to trimethylolpropane,
    (d) 9 to 13% by weight of a polyol obtained by adding propylene oxide to sucrose, and
    (e) 10 to 14% by weight of a polyol obtained by adding propylene oxide and ethylene oxide to diethanolamine, said mixed polyol composition having an average OH value of 440 to 470.

10. A mixed polyol composition according to claim 9, wherein said composition comprises
   (a) 50% by weight of a polyol obtained by adding propylene oxide and ethylene oxide to tolylenediamine,
   (b) 12% by weight of a polyol obtained by adding ethylene oxide to bisphenol,
   (c) 15% by weight of a polyol obtained by adding propylene oxide to trimethylolpropane,
   (d) 11% by weight of a polyol obtained by adding propylene oxide to sucrose, and
   (e) 12% by weight of a polyol obtained by adding propylene oxide and ethylene oxide to diethanolamine, and the average OH value of polyol composition being 450.

11. A composition for producing a rigid polyurethane foam comprising
   (A) an isocyanate component,
   (B) a polyol component comprising
      (a) 48 to 52% by weight of a polyol obtained by adding propylene oxide and ethylene oxide to tolylenediamine,
      (b) 10 to 40% by weight of a polyol obtained by adding ethylene oxide to bisphenol,
      (c) 13 to 17% by weight of a polyol obtained by adding propylene oxide to trimethylolpropane,
      (d) 9 to 13% by weight of a polyol obtained by adding propylene oxide to sucrose, and
      (e) 10 to 14% by weight of a polyol obtained by adding propylene oxide and ethylene oxide to diethanolamine, said mixed polyol composition having an average OH value of 440 to 470, the reaction ratio of (A)/(B) being 1.00 to 1.20 in terms of NCO/OH value,
   (C) 20 parts by weight or more of a blowing agent per 100 parts by weight of the total polyol components, and
   (D) 0.1 to 5 parts by weight of a foam stabilizer per 100 parts by weight of the total polyol components.

12. A composition according to claim 11, wherein the isocyanate component is a mixture of 50 to 55% by weight of polymethylene polyphenyl diisocyanate and 45 to 50% by weight of sucrose tolylene diisocyanate prepolymer, said mixture having NCO percent of 32 to 34.

13. A composition according to claim 11, wherein the foam stabilizer is a polyalkylene glycol silicone block copolymer represented by the formula:

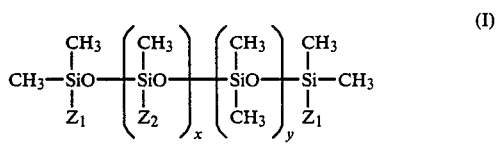

wherein $Z_1$ and $Z_2$ are independently —(CH$_2$)$_a$—(OC$_2$H$_4$)$_b$—(OC$_3$H$_6$)$_c$—OCH$_3$; a is an integer of 3; b is an integer of 15 to 25; c is an integer of 5 to 15; x is an integer of 15 to 4; and y is an integer of 12 to 14.

14. A process for using the rigid polyurethane foam of claim 5 as an heat insulating material for refrigerators.

* * * * *